(12) United States Patent
Lor et al.

(10) Patent No.: US 7,887,221 B2
(45) Date of Patent: Feb. 15, 2011

(54) DIFFUSER WITH LIGHT CONDENSING FUNCTION

(75) Inventors: Whey-Bin Lor, Jhubei (TW);
Kuang-Lin Yuan, Taichung (TW);
Wen-Hao Liu, Kaohsiung (TW)

(73) Assignee: Optivision Technology Inc., Hsinchu (TW)

( * ) Notice: Subject to any disclaimer, the term of this patent is extended or adjusted under 35 U.S.C. 154(b) by 0 days.

(21) Appl. No.: 12/078,453

(22) Filed: Mar. 31, 2008

(65) Prior Publication Data
US 2010/0232022 A1 Sep. 16, 2010

(30) Foreign Application Priority Data
Feb. 14, 2008 (TW) .................. 97202707 U

(51) Int. Cl.
*G02F 1/1335* (2006.01)
(52) U.S. Cl. ...................... 362/339; 362/620
(58) Field of Classification Search ........... 362/620, 362/339, 340, 337
See application file for complete search history.

(56) References Cited
U.S. PATENT DOCUMENTS

| | | | | |
|---|---|---|---|---|
| 5,600,455 A * | 2/1997 | Ishikawa et al. | ............... | 349/57 |
| 5,914,825 A * | 6/1999 | Nishio et al. | ................. | 359/851 |
| 6,130,777 A * | 10/2000 | Yamashita et al. | .......... | 359/456 |
| 6,608,722 B2 * | 8/2003 | Cowan et al. | ............... | 359/599 |
| 7,448,776 B2 * | 11/2008 | Tang | .......................... | 362/339 |
| 2005/0099815 A1 * | 5/2005 | Kim et al. | .................... | 362/339 |
| 2006/0238875 A1 * | 10/2006 | Hwang et al. | ............... | 359/622 |
| 2008/0316603 A1 * | 12/2008 | Jang et al. | .................... | 359/599 |
| 2009/0147179 A1 * | 6/2009 | Yamashita et al. | ............ | 349/64 |
| 2009/0231859 A1 * | 9/2009 | Yeh et al. | ..................... | 362/339 |
| 2009/0296406 A1 * | 12/2009 | Teng et al. | ................... | 362/309 |
| 2010/0007821 A1 * | 1/2010 | Choi et al. | ..................... | 349/64 |
| 2010/0046200 A1 * | 2/2010 | Kuo | .......................... | 362/97.1 |

FOREIGN PATENT DOCUMENTS

KR 2007108793 A * 11/2007

* cited by examiner

*Primary Examiner*—Mark Consilvio

(57) ABSTRACT

One face of a substrate of a diffuser with a light condensing function is disposed with a plurality of prism rods; at least one inclined face of parts of prism rods is disposed with a rough diffusion face; the diffusion face may be positioned on any position of the inclined face of the prism rod; the diffusion face is disposed with a plurality of irregularly arranged raised and indented stripes perpendicular, not perpendicular or parallel to a crest line of the prism rod; chromatid dispersion can be reduced and stripes of the prism rods can be atomized effectively by utilizing the diffusion face to eliminate the occurrence of moiré fringes and elevate the yield factor.

10 Claims, 5 Drawing Sheets

DIFFUSER WITH LIGHT CONDENSING FUNCTION

BACKGROUND OF THE INVENTION

1. Field of the Invention

The present invention relates to an optical film, and more particularly to an optical film with a plurality of prism rod structures required for a backlight system of a liquid crystal display or other electronic devices.

2. Description of Related Art

Please refer to FIG. 1. A backlight system of a general liquid crystal display (LCD) comprises a cold cathode fluorescence lamp (CCFL) 11, light guiding plate (LGP) 12, bottom diffuser 13, prism sheet 14, top diffuser 15 and reflector 16.

Please refer to FIG. 2. A conventional prism sheet is constituted by a plurality of triangular prism rods 141 with their longitudinal axes parallel to each other and a substrate 142. The prism rods 141 are coupled to one side of the substrate 142. A height and a width of each prism rod 141 are the same, and the height of a peak of the prism rod 141 is not varied, a course of the peak is a straight line, two inclined faces at two sides of the peak are symmetrical. The conventional prism sheet 14 is provided with a surface structure constituted by a plurality of regular prism rods 141.

Please refer to FIG. 3. There are three optical path modes of the prism sheet 14:

1. Total Reflection (TRI) Recycle:

When a light beam 143 is projected from an inside of a prism approximately within ±4.degree. relative to a virtual perpendicular axis 140 perpendicular to a bottom face of the prism rod 141, it is influenced by total reflection phenomena of inclined faces of the prism rod 141, recycled toward a back light source after two total reflections and diffused, propagated and utilized continuously;

2. Second Refraction Recycle:

After a light beam 144 is refracted by two prism rods 141, it is then recycled to the back light source and diffused, propagated and utilized continuously;

3. Directed Refraction:

A beam 145 is refracted out through an inclined face of the prism rod 141, this optical path mode have light gathering function; only light beams refracted out within the range of a vision angle 80.degree. of the prism rod 141 can be utilized, as shown in FIG. 3.

Chromatic dispersion and moiré fringes will be easily yielded when a upper layer material film such as a upper differ 15 or another prism sheet is stacked on the prism sheet 14. Furthermore, a face of the prism sheet 14 provided with the plurality of prism rods parallel to each other is rather smooth. If there are defects, they are easy to be found and thus, the prism sheet 14 is considered as a flaw product.

There are many prism sheets with a diffuser layer, for example, a prism sheet disclosed by U.S. Pat. No. 5,844,720 has a plurality of triangular prism rods with their longitudinal axes almost parallel to each other on one side and has the other side roughened. The prism sheet is free from interference fringes, safe from scratching and uniform and high in brightness, being thus useful for liquid crystal display. Furthermore, a prism sheet disclosed by Taiwan Patent No. M293442 comprises a substrate; one side of the substrate comprises a light diffusing layer with raised or indented coarse structure, in which the light diffusion layer has diffusivity of 5% to 90%.

The prism sheets with a light diffusing layer mentioned above are mostly manufactured by allowing a manufactured prism sheet to be further fabricated with a coarse face layer on a bottom thereof; it is rather wastes the labor time. Moreover, a face of the prism sheet with the plurality of parallel prism rods is rather smooth, if there are defects thereon, they are easily found and the prism sheet is considered as a flow product.

A diffusing prism sheet disclosed by Taiwan Patent Application No. 95133798 is provided with a long striped-type coarse diffusion face between two adjacent prism rods. Chromatic dispersion and fringes of prism rods can be respectively effectively eliminated and atomized, moiré fringes are reduced and the yield factor of prism sheets can be increased by mixing light diffused from a diffusion face between two adjacent prism rods and light projected from prism rods. Moreover, a substrate, a plurality of long strip-typed prism rods with longitudinal axes parallel to each other and long strip-typed coarse diffusion faces may be formed into one body such that the prism sheet is easily manufactured.

A diffusing prism sheet disclosed by Taiwan Patent Application No. 96108016 is manufactured by allowing rough coarse portions to be respectively disposed on tops of peaks of a plurality of prism rods and/or two sides of each prism rod so as to reduce block, chromatic dispersion and moiré fringes yielded when the diffusing prism sheet is stacked with the other material film.

However, if the substrate, the plurality of long strip-typed prism sheets with longitudinal axes parallel to each other and the long strip-typed coarse diffusing faces want to be formed into one body, it is rather difficult. Generally, the coarse diffusion face is formed by means of abrasion blasting after the prism rods are formed; the two manufacturing processes are needed, it increases the production time and cost.

SUMMARY OF THE INVENTION

For allowing a diffuser with a light condensing function to have a new structure to enable it to be manufactured easier, the present invention is proposed.

The main object of the present invention is to propose a diffuser with a light condensing function, allowing it to be manufactured easily to save the production cost and capable of being free from chromatic dispersion when the diffuser and the other material are stacked with each other.

Another object of the present invention is to provide a diffuser with a light condensing function, capable of atomizing stripes of prism rods and helpful for elevating the yield factor of the diffuser and shielding defects of a backlight module.

Still another object of the present invention is to provide a diffuser with a light condensing function, capable of reducing moiré fringes yielded when the diffuser is stacked with the other material film.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 4:
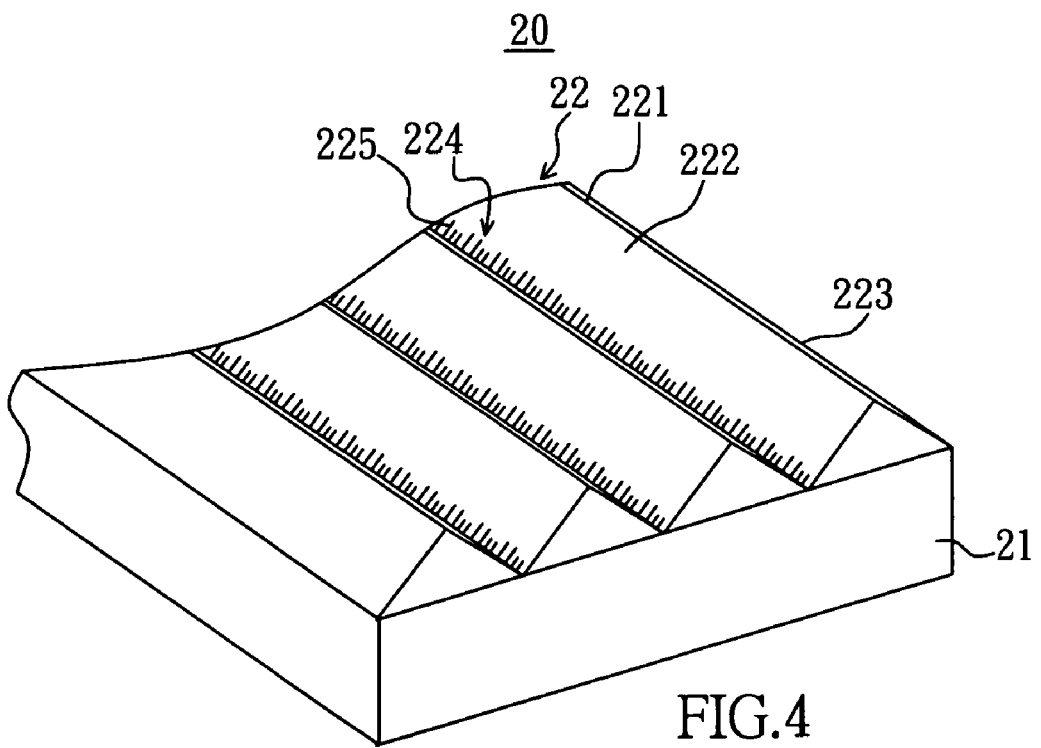
FIG. 4 is a schematic view, showing a diffuser of a first preferred embodiment of the present invention.
Figure 5:
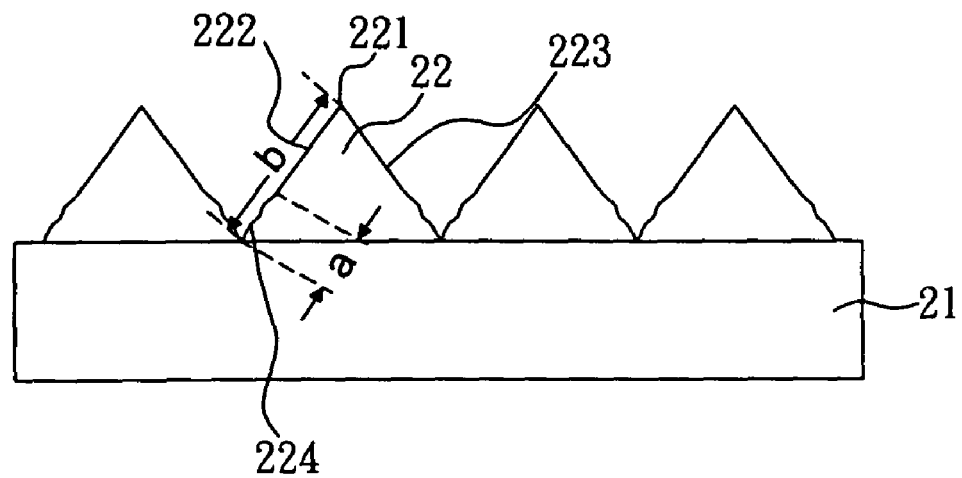
FIG. 5 is a side view, showing a diffuser of the first embodiment according to the present invention.
Figure 6:
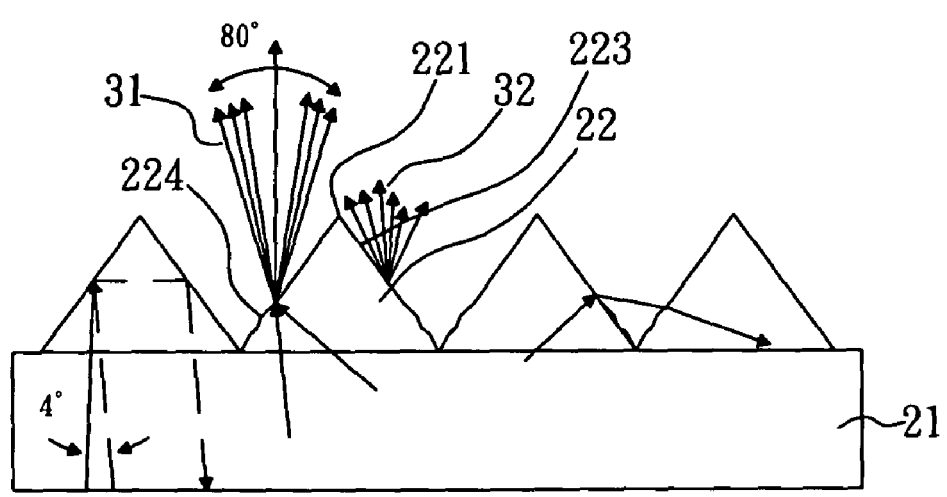
FIG. 6 is a schematic view, showing diffusing light of a diffuser of the first embodiment according to the present invention.

Please refer to FIGS. 4, 5 and 6. A diffuser with a light condensing function of the present invention is used for eliminating chromatic dispersion of prism rods and the occurrence of moiré fringes. A diffuser 20 of a first preferred embodiment according to the present invention comprises a substrate 21 used for allowing light to be penetrated through; one surface of the substrate 21 is disposed with a plurality of longitudinally arranged long strip-typed prism rods 22; each prism rod is provide with a crest line 221, a first inclined face 222 and a second inclined face 223; the crest line 221 is positioned at the highest position of the prism rod 22; the first inclined face 222 and the second inclined face 223 are respectively extended from two sides of the crest line 221 to the substrate 21; each of bottoms of the first inclined faces 222 and/or the second inclined faces of parts of prism rods 22 close to the substrate 21 is disposed with a rough diffusion face 224; the diffusion face 224 is disposed with a plurality of irregularly arranged raised and indented stripes 225; the plurality of stripes 225 are perpendicular to the crest line 221. As shown in FIG. 5, a width "a" of the diffusion face 224 is a value between 2% and 90% of a width "b" of the first inclined face 222 or the second inclined face 223. There is only one manufacturing process needed to form the prism rods 22 and the diffusion face 224 simultaneously for the diffuser 20. Thus, the production time and cost can be reduced.

The diffuser 20 of the present invention can reduce chromatic dispersion and atomize stripes of the prism rods 22 effectively by mixing light 31 diffused out from the diffusion face 224 with light 32 projected out from the prism rod 22 as shown in FIG. 6, and in the meantime, reduce moiré fringes. Moreover, because the prism rod 22 is provided with the long strip-typed coarse diffusion face 224, the entire outlook of the diffuser 20 is not a completely smooth face, even if other defects are yielded on the first inclined face 222 and/or the second inclined face 223, they cannot be found easily to cause the diffuser 20 to be considered as a flaw product thereby capable of elevating the yield factor of the prism sheets 20.

Figure 7:
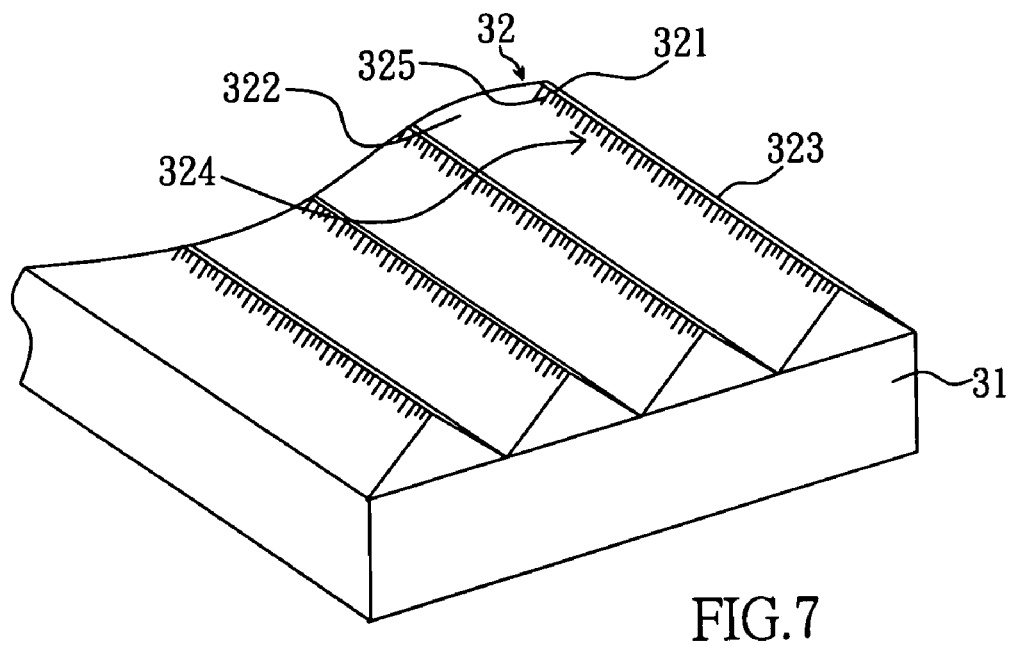
FIG. 7 is a schematic view, showing a diffuser of a second preferred embodiment according to the present invention.

Please refer to FIG. 7. A diffuser 30 of a second preferred embodiment according to the present invention also comprises a substrate 31 and a plurality of prism rods 32. Each prism rod 32 has a crest line 321, a first inclined face 322 and a second inclined face 323. But, upper ends of the first inclined face 322 and/or the second inclined face of the plurality of prism rods 32 close to the crest lines 321 are disposed with rough diffusion faces 324; each diffusion face 324 is disposed with a plurality of irregularly arranged rough stripes 325; the plurality of rough stripes 325 are perpendicular to the crest line 321; a width of the diffusion face 324 is a value between 2% and 90% of a width of the first inclined face 322 or the second inclined face 323. There is only one manufacturing process needed to form the prism rods 32 and the diffusion face 324 simultaneously for the diffuser 30. Thus, the production time and cost can be reduced. Moreover, the diffuser 30 has the other functions held by the diffuser 20 mentioned above.

Figure 8:
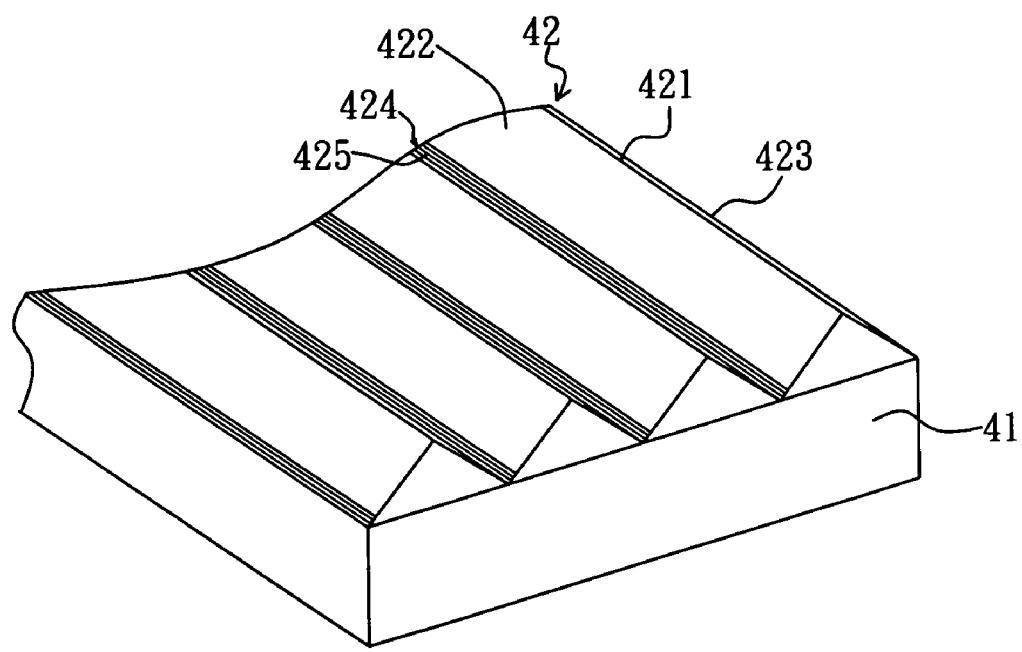
FIG. 8 is a schematic view, showing a diffuser of a third preferred embodiment according to the present invention.

Please refer to FIG. 8. A diffuser 40 of a third preferred embodiment according to the present invention also comprises a substrate 41 and a plurality of prism rods 42. Each prism rod 42 has a crest line 421, a first inclined face 422 and a second inclined face 423. But, lower ends of the first inclined face 422 and/or the second inclined face of the plurality of prism rods 42 close to the substrate 41 are disposed with rough diffusion faces 424; each diffusion face 424 is disposed with a plurality of irregularly arranged rough stripes 425; the plurality of rough stripes 425 are parallel to the crest line 421; a width of the diffusion face 424 is a value between 2% and 90% of a width of the first inclined face 422 or the second inclined face 423. There is only one manufacturing process needed to form the prism rods 42 and the diffusion face 424 simultaneously for the diffuser 40. Thus, the production time and cost can be reduced. Moreover, the diffuser 40 has the other functions held by the diffuser 20 mentioned above.

Figure 9:
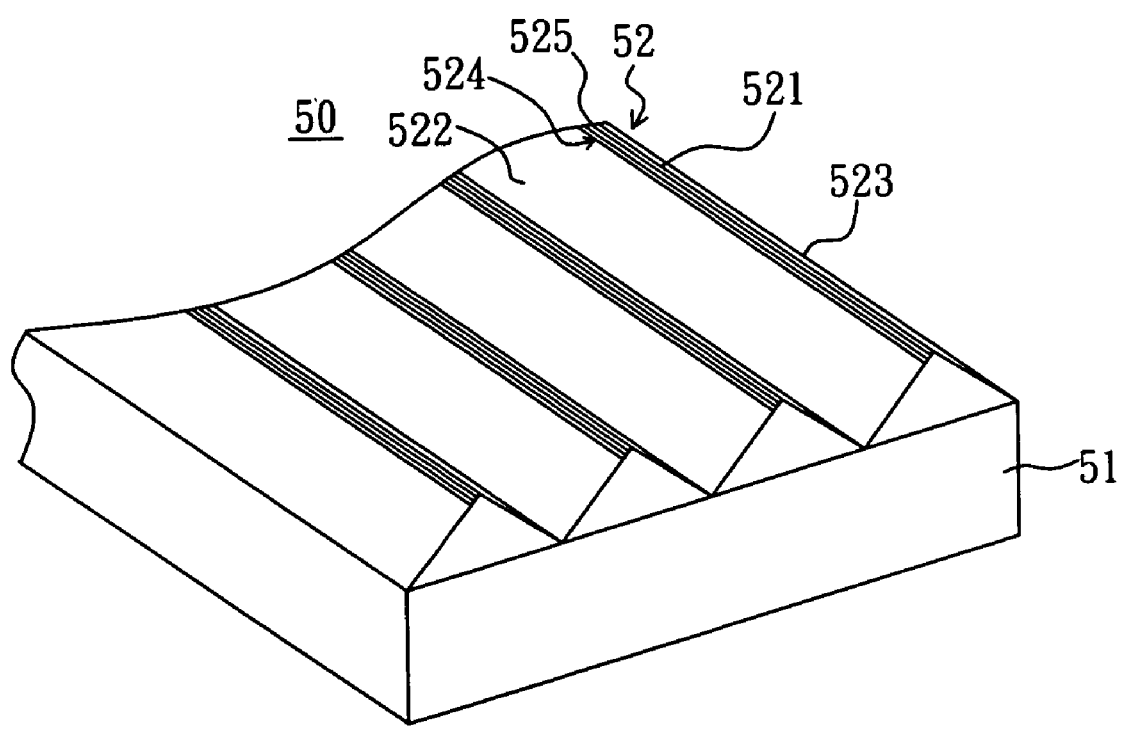
FIG. 9 is a schematic view, showing a diffuser of a fourth preferred embodiment according to the present invention.

Please refer to FIG. 9. A diffuser 50 of a fourth preferred embodiment according to the present invention also comprises a substrate 51 and a plurality of prism rods 52. Each prism rod 52 has a crest line 521, a first inclined face 522 and a second inclined face 523. But, upper ends of the first inclined face 522 and/or the second inclined face of the plurality of prism rods 52 close to the crest lines 521 are disposed with rough diffusion faces 524; each diffusion face 524 is disposed with a plurality of irregularly arranged rough stripes 525; the plurality of rough stripes 525 are parallel to the crest line 521; a width of the diffusion face 524 is a value between 2% and 90% of a width of the first inclined face 522 or the second inclined face 523. There is only one manufacturing process needed to form the prism rods 52 and the diffusion face 524 simultaneously for the diffuser 50. Thus, the production time and cost can be reduced. Moreover, the diffuser 50 has the other functions held by the diffuser 20 mentioned above.

Figure 1:
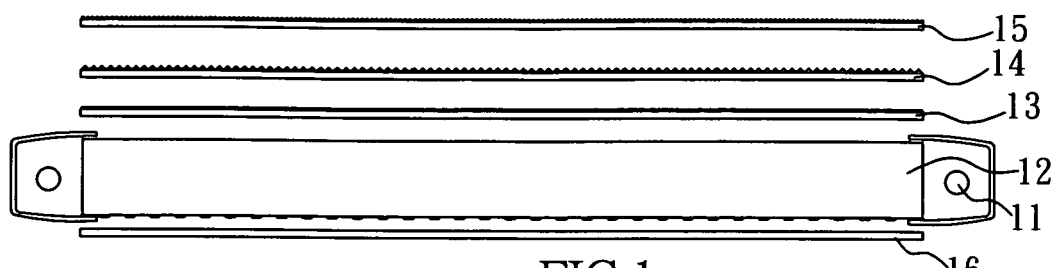
FIG. 1 is a schematic of a conventional backlight system of a display.
Figure 2:
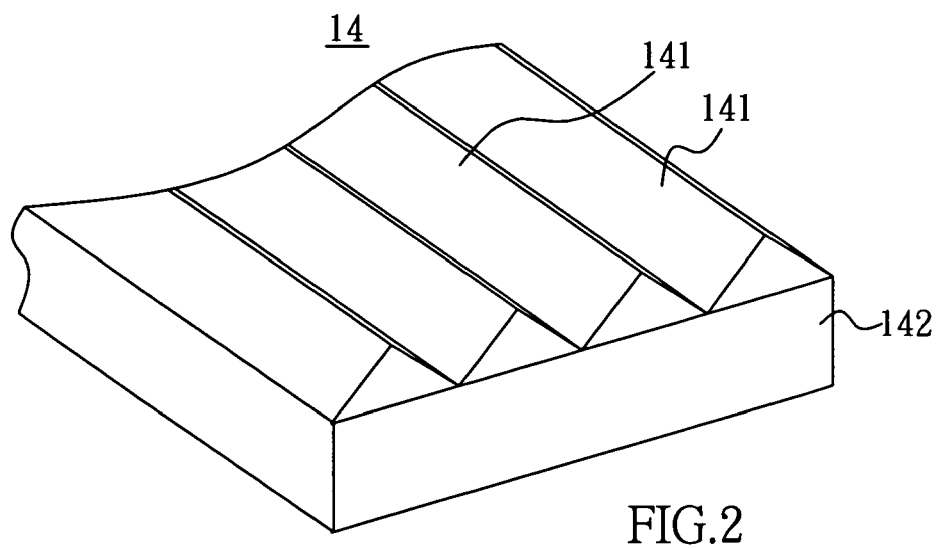
FIG. 2 is a schematic view of a conventional prism sheet.
Figure 3:
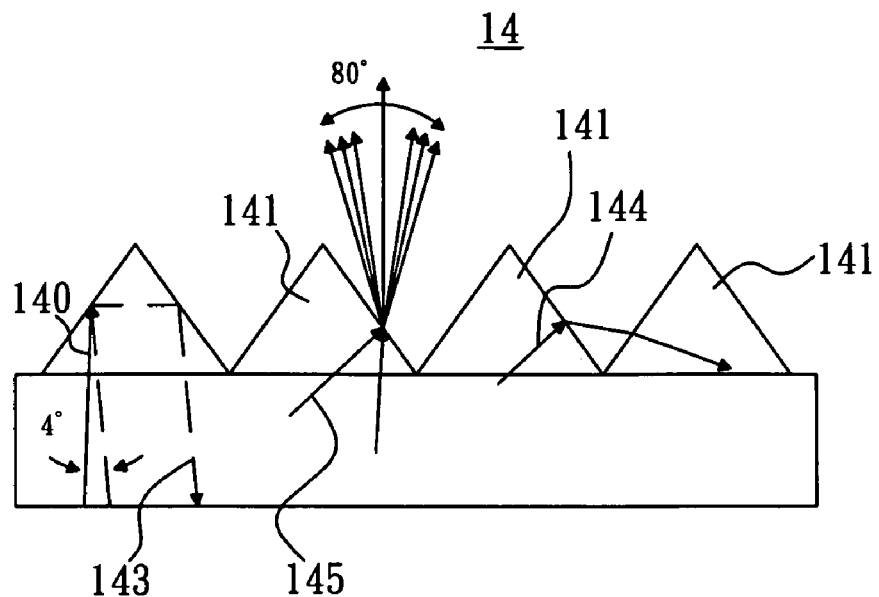
FIG. 3 is a schematic view of various light refraction modes of a conventional prism sheet.

Each of inclined faces of a plurality of prism rods of a diffuser of the present invention may be disposed with a rough diffusion face; a width of the diffusion face is a value between 2% and 90% of a width of the inclined face of the prism rod. All two inclined faces of the prism rod may respectively be disposed with a diffusion face or only one inclined face thereof is disposed with a diffusion face. The diffusion face may be positioned on any position of the inclined face of the prism rod, the diffusion face is disposed with a plurality of irregularly arranged rough stripes and the irregularly arranged rough stripes may be perpendicular, not perpendicular or parallel to a crest line of the prism rod. The width of the diffusion face may be randomly or regularly varied. The diffusion face of the diffuser of the present invention may be utilized to eliminate chromatic dispersion and atomize the stripes of the prism rods, and reduce moiré fringes to elevate the yield factor. Besides, one single diffuser of the present invention can be used to replace the prism sheet 14 plus the upper diffuser 15 shown in FIG. 1 so as to attain to the two films coupling effect and reduce a thickness of the backlight module to reduce the cost expense.

A diffuser of the present invention can attain to the following effects:

1. capable of reducing the production time and cost;

2. capable of eliminating chromatic dispersion of prism rods;

3. atomizing stripes of prism rods, reducing occurrence of moiré fringes;

4. atomizing stripes of prism rods, helpful for elevating the yield factor; and 5. atomizing stripes of prism rods, shielding defects of a backlight module.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diffuser with a light condensing function comprising:
    a substrate; and
    a plurality of longitudinally arranged long strip-typed prism rods being disposed on said substrate, each of said prism rods being provided with a crest line, a first inclined face and a second inclined face, said crest line being positioned at the highest position of said prism rod, and said first inclined face and said second inclined face respectively extending from two sides of said crest line to said substrate;
    wherein at least one of said first inclined face and said second inclined face is disposed with a diffusion face which has a randomly or regularly varied width respectively and is provided with a plurality of irregularly arranged raised and indented stripes.

2. The diffuser with a light condensing function according to claim 1, wherein said inclined face has a width, and said randomly or regularly varied width is provided with a value between 2% and 90% of the width of said inclined face.

3. The diffuser with a light condensing function according to claim 1, wherein said raised and indented stripes are perpendicular to said crest line.

4. The diffuser with a light condensing function according to claim 1, wherein said raised and indented stripes are parallel to said crest line.

5. The diffuser with a light condensing function according to claim 2, wherein said raised and indented stripes are perpendicular to said crest line.

6. The diffuser with a light condensing function according to claim 2, wherein said raised and indented stripes are parallel to said crest line.

7. The diffuser with a light condensing function according to claim 5, wherein said diffusion face is close to said substrate.

8. The diffuser with a light condensing function according to claim 5, wherein said diffusion face is close to said crest line.

9. The diffuser with a light condensing function according to claim 6, wherein said diffusion face is close to said substrate.

10. The diffuser with a light condensing function according to claim 6, wherein said diffusion face is close to said crest line.

* * * * *